United States Patent Office 2,992,224
Patented July 11, 1961

2,992,224
PROCESS OF PREPARING DIPYRIDYLS
Francis E. Cislak, Indianapolis, Ind., assignor to Reilly Tar & Chemical Corporation, Indianapolis, Ind., a corporation of Indiana
No Drawing. Filed Mar. 21, 1960, Ser. No. 16,116
6 Claims. (Cl. 260—296)

My present invention relates to a process of preparing dipyridyls. More specifically, it relates to a process of preparing 2,2'-dipyridyls and 2,4'-dipyridyls having the general formulae:

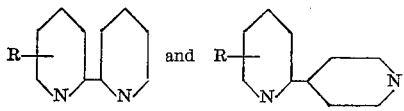

wherein R is hydrogen or lower alkyl.

My process of preparing dipyridyls comprises the interaction of an alkali metal-pyridine, such as pyridyl sodium, pyridyl lithium, or pyridyl potassium, with a quaternary pyridinium salt of a pyridine-N-oxide.

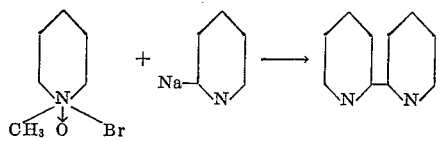

Illustrative of the manner in which my invention may be carried out, I cite the following examples.

EXAMPLE 1

*2,2'-dipyridyl and 2,4'-dipyridyl*

To a solution composed of 190 grams of the methyl bromide quaternary salt of pyridine-N-oxide in 500 grams of dioxane, maintained at room temperature, I add a suspension of 103 grams of a mixture of 2-pyridyl sodium and of 4-pyridyl sodium in 500 grams of dioxane. As the suspension of pyridyl sodium is added, a reaction occurs whereby 2,2'-dipyridyl and 2,4'-dipyridyl are formed. After all of the pyridylsodium has been added, the mixture is stirred for an additional hour. Then the mixture of isomers of dipyridyl is separated from the dioxane in any convenient manner. One convenient way of isolating the dipyridyls comprises distilling off the dioxane, adding about 300 cc. of water to the residue, and separating the layer of dipyridyls from the water solution. The thus-separated mixture of isomeric dipyridyls can be separated into the individual isomers by fractional distillation under vacuum. An efficient fractionating column must be used as there is only a few degrees difference in the boiling points of these two isomers.

In place of the dioxane solvent I can use other non-polar solvents, such for example as diethyl ether, or mixtures of dioxane and diethyl ether, etc.

I need not conduct the reaction at room temperature. I can, if desired, carry out the reaction at temperatures of about 0° C. or even at lower temperatures. Or I can conduct the reaction at elevated temperatures of the order of 40–50° C.; I prefer to keep the reaction temperature below about 60° C. as the quaternary salt of the pyridine-N-oxide seems to be unstable at higher temperatures with resultant loss of yield.

I need not use the methyl bromide quaternary salt of the pyridine-N-oxide. Instead I can use other alkyl halide quaternary salts of pyridine-N-oxide, or I can use the methyl sulfate quaternary pyridinium salt of the -N-oxide.

The quaternary salts which are useful in carrying out my process have the general formula:

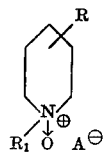

wherein R is hydrogen or lower alkyl, $R_1$ is alkyl, aryl, or pyridyl alkyl, and $A^\ominus$ is an anion.

EXAMPLE 2

*2-(4'-methylpyridyl-2')pyridine*

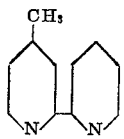

A solution of 225 grams of the methosulfate 4-picoline-N-oxide quaternary salt in 600 cc. of diethylether is cooled to between about —5° C. and 0° C. To the cold solution there is added, in small portions with stirring, 100 grams of 2-pyridyl-lithium dispersed in 500 cc. of diethyl ether.

As the pyridyl-lithium is added to the methosulfate-4-picoline-N-oxide, a reaction occurs whereby 2-(4'-methylpyridyl-2')pyridine is formed. After all the pyridyl-lithium has been added, the solution is stirred for an additional hour. Then the 2-(4'-methylpyridyl-2')pyridine is separated from the reaction mixture in any convenient manner.

I claim as my invention:

1. The process of preparing bipyridyls of the class consisting of 2,2'-bipyridyls and 2,4'-bipyridyls which compounds have the structural formulae:

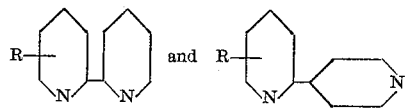

wherein R is selected from the class consisting of hydrogen and lower alkyl, which comprises adding an alkali metal pyridine to a solution of a quaternary pyridinium salt of a pyridine-N-oxide, which compounds have the structural formula:

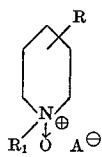

wherein R is a member of the group consisting of hydrogen and lower alkyl, $R_1$ is selected from the class consisting of alkyl, phenyl, and pyridyl alkyl, and $A^\ominus$ is an anion, selected from the group consisting of halides and sulfate.

2. The process of preparing 2,2'-bipyridyl and 2,4'-bipyridyl which comprises adding a mixture comprising 2-pyridylsodium and 4-pyridylsodium to the methyl bromide quaternary salt of pyridine-N-oxide.

3. The process of preparing 2-(4'-methylpyridyl-2') pyridine which comprises adding 2-pyridyl-lithium to a solution of the methosulfate quaternary pyridinium salt of 4-picoline-N-oxide.

4. The process of claim 1 in which the alkali metal pyridine used is pyridyl sodium.

5. The process of claim 1 in which the alkali metal pyridine used is 2-pyridyl-lithium.

6. The process of claim 1 in which the alkali metal pyridine used is a mixture of 2-pyridylsodium and of 4-pyridylsodium.

References Cited in the file of this patent

Ishikawa et al.: Chem. Abstracts, vol. 50, col. 14712 (1956).

Linnell: J. Org. Chem., vol. 22, pp. 1691–2 (1957).